Patented Mar. 13, 1945

2,371,133

UNITED STATES PATENT OFFICE 2,371,133

HYDRAZIDES CONTAINING HYDROXYALKYL RADICALS AND PROCESS OF MAKING SAME

Charles Graenacher, Riehen, Richard Sallmann, Bottmingen, and Jost Frei, Basel, Switzerland, assignors to Society of Chemical Industry in Basle, Basel, Switzerland, a Swiss company No Drawing. Application November 25, 1941, Serial No. 420,422. In Switzerland December 24, 1940

18 Claims. (Cl. 260—404.5)

It has been found that new hydrazine derivatives containing hydroxyalkyl groups are obtained if hydrazides containing at least one hydrogen atom bound to a hydrazine nitrogen atom and at least one radical containing at least four carbon atoms are treated with alkylating agents which are capable of introducing aliphatic radicals containing hydroxy groups, such as 1:2-alkylene oxides or polyvalent alcohols and their ethers containing an inorganic acid radical, or if hydrazines containing hydroxyalkyl groups are caused to react with acylating agents, the parent substances being so selected that at least one of them, apart from the radical of the hydrazine which contains the hydroxyalkyl groups, contains at least one radical with at least four carbon atoms.

Hydrazines from which the hydrazides to be used as parent materials may be derived or which may themselves be used as parent substances are, for example, hydrazine itself, phenylhydrazine, β-phenyl-α-methylhydrazine, dodecylhydrazine, α:α'-dihydroxyethylhydrazine and the like. Carboxylic acids which may be used for the formation of hydrazides may be aliphatic, aromatic, aliphatic-aromatic, cycloaliphatic, or heterocyclic carboxylic acids, such as acetic acid, but preferably carboxylic acids of high molecular weight, such as lauric, palmitic, stearic, oleic, naphthoic, p-stearoylaminobenzoic, resinic, naphthenic and nicotinic acids. Monoacylated hydrazines are specially suitable parent materials.

The hydrazides to be used as parent substances in the present invention are either known or can be directly prepared by analogous processes.

Suitable 1:2-alkylene oxides are, for example, ethylene oxide, 1:2-propylene oxide, 1:2-butylene oxide and their substitution products, such as epichlorhydrin, glycide, glycidic acid and their esters. Ethylene chlorhydrin, glycerine chlorhydrins or the monochloro compound of tetra-ethylene glycol may be named as polyvalent alcohols or ethers of polyvalent alcohols which contain an inorganic acid radical.

The reaction with the alkylene oxides or their substitution products takes place preferably at raised temperatures, if desired, in the presence of catalysts or of agents which promote elimination of water. Examples of such substances are sodium hydroxide, sodium ethylate, bleaching earths, such as Tonsil, and also activated charcoal. It can also prove expedient to carry out the reaction in the presence of indifferent solvents, such as xylene.

It is also possible to cause two or more of the above mentioned alkylene oxides or substitution products thereof or derivatives of polyvalent alcohols to react on the hydrazides in succession.

When substances of low boiling point are used, for example, ethylene oxide, it is preferable to work under pressure.

According to the nature of the reaction conditions, as well as the quantity of the alkylene oxide or derivative of a polyvalent alcohol, it is possible to introduce one or more radicals of a polyvalent alcohol—for example, from 2 to 4 or a still greater number of these radicals—into the hydrazide used as parent material. Generally speaking, the solubility in water of the products increases as the number of radicals of polyvalent alcohols increases.

The acylation of the hydrazines containing hydroxyalkyl groups can be carried out in the usual manner, for example, by heating with carboxylic acids, such as stearic acid, if desired, in the presence of agents promoting the elimination of water, or by treatment with carboxylic acid halides, such as lauric acid chloride, preferably in the presence of acid-binding agents.

It is also possible to carry out the present process as a combination process, by allowing acylating agents and then the above named alkylating agents to act on hydrazines, or by first hydroxyalkylating the hydrazines and then acylating them. In both cases, at least one of the parent substances must contain at least one radical with at least 4 carbon atoms, that is to say, without taking into account the number of carbon atoms which may be present in the radicals of the hydrazines containing hydroxy-alkyl groups.

The products of the present invention may be designated as hydrazides which contain at least one radical containing at least 4 carbon atoms and are substituted at at least one hydrazine nitrogen atom by at least one aliphatic radical containing at least one oxygen atom, at least one oxygen atom being contained in a hydroxyl group, which hydrazides are liquid to solid substances soluble or easily dispersible in water. The products of the invention obtained with the aid of 1:2-alkylene oxides contain at least one hydrazine nitrogen atom, at least one aliphatic radical containing at least one oxygen atom, at least one oxygen atom being contained in a hydroxy group, and one oxygen atom being bound to the β-carbon atom of the aliphatic radical connected with a hydrazine nitrogen atom; in other words these hydrazides are characterized by the atomic grouping

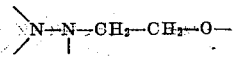

The corresponding products of the invention obtained with the aid of glycidol possess the characteristic atomic grouping

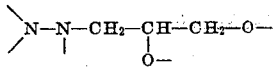

In other words such glycidol derivatives are characterized by aliphatic radicals containing at least two oxygen atoms, at least one oxygen atom being contained in a hydroxyl group, one oxygen atom being bound to the β-carbon atom of the aliphatic radical connected with a hydrazine nitrogen atom and another oxygen atom being bound to the corresponding γ-carbon atom. Hydrazides treated according to the present invention with at least one mol of ethylene oxide are substituted at at least one hydrazine nitrogen atom by at least one radical of the formula —(CH$_2$—CH$_2$—O—)$_x$H wherein $x$ stands for a whole number and the free valence adheres at a hydrazine nitrogen atom. Thus, if one mol of ethylene oxide is used, the atomic grouping:

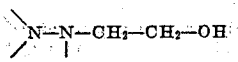

is present in the product of the invention; if an excess of ethylene oxide is used, polyglycol ether radicals are introduced and the atomic grouping

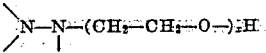

is present in the final products. Since the parent materials—hydrazides—contain two nitrogen atoms and at least one hydrogen atom bound to a nitrogen atom—usually not only one but two or three hydrogen atoms—it is in general impossible to designate the exact position of that hydrogen atom which reacts with a 1:2-alkylene oxide. This is the reason why the products of the invention in general cannot be characterized by exact formulae and are therefore in certain cases best described by their process of manufacture; there is however no doubt, that hydrogen atoms connected with hydrazine nitrogen atoms enter in reaction with the alkylating agents, e. g. the 1:2-alkylene oxides.

In so far as they contain an aliphatic or cycloaliphatic radical of high molecular weight—especially a radical containing at least 12 carbon atoms—and are sufficiently soluble in water, the products of the present invention can find application as textile auxiliary products, especially as levelling, dispersing, softening, emulsifying and washing agents, that is, either alone or in combination with other substances usually used in conjunction with textile auxiliary products. Their use as levelling agents in the dyeing of wool, for example, with metal complex compounds of acid dyestuffs, has proved to be especially advantageous.

The following examples illustrate the invention, the parts, unless otherwise stated, being by weight:

*Example 1*

3.8 parts of stearic acid phenylhydrazide (prepared by heating stearic acid with phenylhydrazine to 160° C.) are heated with 2.4 parts of glycide with stirring to 140–150° C. (internal temperature) until a sample of the reaction mass dissolves in water to form a solution which is only slightly turbid. When cold, the reaction mass is a brownish colored, wax-like product, which possesses a maximum solubility in water at about 60–70° C., as both above and below this temperature a milky turbidity is formed. The product possesses pronounced levelling action in dyebaths containing acid wool dyestuffs, and its solutions do not cause precipitation of dyestuffs containing sulphonic acid groups. In the same way butyric acid hydrazide or benzoic acid hydrazide may be treated with glycidol or with ethylene oxide.

*Example 2*

3.8 parts of β-stearoyl-β-methyl-α-phenylhydrazide (prepared by heating stearic acid with β-methyl-α-phenylhydrazine) are heated with 2.3 parts of glycide as described in Example 1. A product is formed which possesses similar properties to those of the product of Example 1.

*Example 3*

12 parts of β:β-dihydroxyethyl-hydrazine (prepared from ethylene oxide and hydrazine hydrate) are heated with 27 parts of stearic acid and 1.2 parts of boric acid for 2 hours with exclusion of oxygen to 160–180° C. whilst stirring, during which operation the theoretical quantity of water distils. A brownish-colored, half-solid mass is formed which dissolves in water with only slight turbidity. Its aqueous solution yields no precipitate even on addition of acids. The product possesses weak cationactive properties.

7.6 parts of the condensation products thus obtained are heated with 1.6 parts of glycide for 2 hours to 110–120° C. The reaction product is then taken up in ether and the ethereal solution is filtered and then strongly cooled, when the new product separates out and may be obtained in a purified form by filtration and drying under reduced pressure. The new compound dissolves in water with the formation of a strongly foaming solution and is not precipitated therefrom either by acids or by basic agents. It possesses a pronounced levelling action in the acid wool dyebath.

*Example 4*

14 parts of stearic acid hydrazide (M. P. 102–103° C., obtained from technical stearic acid) are heated with 18 parts of epichlorhydrin for 6 hours at 100° C., the reaction mixture becoming dark brown in color. The excess of epichlorhydrin is distilled under reduced pressure at 100° C., 24 parts of a brown colored, resin-like compound remaining behind. This is soluble in boiling water to a solution that is only very slightly turbid. Its solutions possess weak cation active properties.

12 parts of the above reaction product are heated with 2.2 or 4.5 parts of ethylene oxide in an autoclave for 5 hours at 135–140° C. The dark brown reaction product which is obtained differs from its parent substance by its better solubility and, by the fact that it precipitates Neolan Pink B (Color Index Supplement, page 47) either not at all or only very slightly from its solutions and exerts an increased levelling power when dyeing with metal complex compounds of acid dyestuffs.

*Example 5*

14 parts of stearic acid hydrazide (prepared from technical stearic acid) are dissolved on the water bath in 16 parts of xylene and 7.5 parts of glycide are slowly dropped into the solution whilst stirring. The temperature of the reaction mixture rises a few degrees above the bath temperature. The reaction mixture is heated on the water bath a further hour after the reaction has died away, and the xylene is then distilled under reduced pressure. The residue is a pale colored mass, which becomes hard and brittle on cooling. It dissolves in boiling water to an almost clear solution with a weakly alkaline reaction and is not precipitated therefrom by addition of acids.

*Example 6*

21 parts of the reaction product obtained from stearic acid hydrazide and 2 mols of glycide are heated with 4.5 parts of ethylene oxide for 5 hours to 135–140° C. A brown reaction product is obtained which is liquid when warm but solid at room temperature. It differs from the parent substance in so far as it is more readily soluble in water and has a stronger levelling action when used in dyeing wool with metal complex compounds of acid dyestuffs. Instead of about 3 mols of ethylene oxide as employed above, a greater excess for instance 6 mols may be used whereby a similar product of improved solubility in water is obtained.

*Example 7*

12 parts of the hydrazide of coconut fatty acids and 9 parts of ethylene oxide are heated together in an autoclave for 5 hours at 145–150° C. After this time all the ethylene oxide has been taken up, and the reaction mass is a pale colored oil. It dissolves in water on addition of a little sulphuric acid, forming a strongly foaming solution. The solutions thus obtained possess a pronounced washing action in an acid bath. Instead of with ethylene oxide the coconut fatty acid hydrazide may be heated with another alkylating agent which introduces an aliphatic radical containing hydroxyl groups, e. g. with ethylene chlorohydrin, preferably in the presence of an acid binding agent.

*Example 8*

14 parts of stearic acid hydrazide are heated with 9 parts of ethylene oxide in an autoclave for 5 hours at 135–140° C. A yellow, easily melted, wax-like product is obtained which may be dissolved in water, to which a little sulphuric acid has been added, to form acid to neutral solutions. Even small quantities of the product, when added to dye baths containing metal complex compounds of acid dyestuffs, exert an excellent levelling effect.

A similar product is obtained if the same quantity of ethylene oxide be caused to react in several portions. Instead of about 7 mols of ethylene oxide, as employed above, a greater excess for instance 15 mols may be used whereby a similar product of improved solubility in water is obtained.

*Example 9*

14 parts of stearic acid hydrazide and 16 parts of ethylene oxide are heated to 145–150° C. in an autoclave for 5 hours, after which time the whole of the ethylene oxide has been absorbed. A pale colored, wax-like product is obtained which dissolves to an almost clear solution in water to which a little sulphuric acid has been added and which has a strong levelling action when used as an addition when dyeing wool with acid wool dyestuffs.

*Example 10*

Wool is dyed with

| | Per cent |
|---|---|
| Neolan Dark Green B (Schultz-Lehmann, Farbstofftabellen, 7th edition, vol. II, page 153) | 4 |
| Sulphuric acid | 5 |
| The product of Example 1 | 0.8 |

The liquor ratio is 1:50, the wool being treated at the boil for 1½ hours.

By the addition of the new product, a much stronger and bloomier dyeing is obtained than is the case when dyeing with 5% sulphuric acid alone.

*Example 11*

Wool is dyed in a liquor ratio of 1:40 with

| | Per cent |
|---|---|
| Acid Black NN (Color Index No. 308) | 8 |
| Sulphuric acid | 4 |
| Glauber's salt | 10 |
| The product of Example 8 | 0.5 | for 1 hour at the boil. A bloomy black is obtained which is tinctorially stronger than that obtained without the help of the auxiliary product.

What we claim is:

1. A process for the manufacture of hydrazine derivatives containing hydroxyalkyl radicals which comprises condensing one mol of a hydrazide of an aliphatic carboxylic acid containing at least 2 carbon atoms, which hydrazide contains at least one hydrogen atom bound to a hydrazine nitrogen atom with at least one mol of an alkylating agent which is capable of introducing an aliphatic radical containing the grouping

and also hydroxyl groups.

2. A process for the manufacture of hydrazine derivatives containing hydroxyalkyl radicals which comprises condensing one mol of a hydrazide of an aliphatic carboxylic acid containing at least 12 carbon atoms, which hydrazide contains at least one hydrogen atom bound to a hydrazine nitrogen atom with at least one mol of an 1:2-alkylene oxide.

3. A process for the manufacture of hydrazine derivatives containing hydroxyalkyl radicals which comprises condensing one mol of a hydrazide of an aliphatic carboxylic acid containing at least 12 carbon atoms in which hydrazide at least one hydrogen atom is bound to a hydrazine nitrogen atom with at least one mol of ethylene oxide.

4. A process for the manufacture of hydrazine derivatives containing hydroxyalkyl radicals which comprises condensing one mol of stearic acid hydrazide with at least one mol of ethylene oxide.

5. A process for the manufacture of a hydrazine derivative containing hydroxyalkyl radicals which comprises condensing one mol of stearic acid hydrazide with about 7 mols of ethylene oxide.

6. A process for the manufacture of hydrazine derivatives containing hydroxyalkyl radicals which comprises condensing one mol of a hydrazide of an aliphatic carboxylic acid containing at least 12 carbon atoms in which hydrazide at least one hydrogen atom is bound to a hydrazine nitrogen atom with at least one mol of glycidol.

7. A process for the manufacture of a hydrazine derivative containing hydroxyalkyl radicals which comprises condensing one mol of stearic acid phenyl hydrazide with about 3 mols of glycidol.

8. A process for the manufacture of hydrazine derivatives containing hydroxyalkyl radicals which comprises condensing one mol of a hydrazide of an aliphatic carboxylic acid containing at least 12 carbon atoms in which hydrazide at least one hydrogen atom is bound to a hydrazine nitrogen atom with at least one mol of glycidol and at least one mol of ethylene oxide.

9. A process for the manufacture of a hydrazine derivative containing hydroxyalkyl radicals which comprises condensing one mol of stearic acid hydrazide with about 2 mols of glycidol and condensing the product thus obtained with about 3 mols of ethylene oxide.

10. Hydrazides of aliphatic carboxylic acids which contain at least 12 carbon atoms and are substituted at at least one hydrazine nitrogen atom by at least one aliphatic radical containing the grouping

and at least one oxygen atom, at least one oxygen atom being contained in a hydroxyl group, which hydrazides are liquid to solid substances soluble to easily dispersible in water.

11. Hydrazides of aliphatic carboxylic acids which contain at least 12 carbon atoms and are substituted at at least one hydrazine nitrogen atom, by at least one aliphatic radical containing the grouping

and at least one oxygen atom, at least one oxygen atom being contained in a hydroxyl group and one oxygen atom being bound to the β-carbon atom of the aliphatic radical connected with a hydrazine nitrogen atom, which hydrazides are liquid to solid substances soluble to easily dispersible in water.

12. Hydrazides of aliphatic carboxylic acids containing at least 12 carbon atoms which are substituted at at least one hydrazine nitrogen atom by at least one radical of the formula
—(CH$_2$—CH$_2$—O—)$_x$H wherein $x$ stands for a whole number and the free valence adheres to a hydrazine nitrogen atom, which hydrazides are liquid to solid substances soluble or easily dispersible in water.

13. Stearic acid hydrazides which are substituted at at least one hydrazine nitrogen atom by at least one radical of the formula —(CH$_2$—CH$_2$—O—)$_x$H wherein $x$ stands for a whole number and the free valence adheres to a hydrazine nitrogen atom, which hydrazides are liquid to solid substances soluble or easily dispersible in water.

14. The stearic acid hydrazide substituted at at least one hydrazine nitrogen atom by at least one radical of the formula —(CH$_2$—CH$_2$—O—)$_x$H wherein $x$ stands for a whole number and the free valence adheres to a hydrazine nitrogen atom, which hydrazide is obtained by condensing one mol of stearic acid hydrazide with about 7 mols of ethylene oxide and is a waxlike substance being soluble in diluted acid, and exerting good levelling powers on wool dye-stuffs.

15. Hydrazides of aliphatic carboxylic acids containing at least 12 carbon atoms which are substituted at at least one hydrazine nitrogen atom by at least one aliphatic radical containing the grouping

and at least two oxygen atoms, at least one oxygen atom being contained in a hydroxyl group, one oxygen atom being bound to the β-carbon atom of the aliphatic radical connected with a hydrazine nitrogen atom and another oxygen atom being bound to the corresponding γ-carbon atom, which hydrazides are liquid to solid substances soluble to easily dispersible in water.

16. The stearic acid phenyl hydrazide substituted at at least one hydrazine nitrogen atom by at least one aliphatic radical containing the grouping

and at least two oxygen atoms, at least one oxygen atom being contained in a hydroxyl group, one oxygen atom being bound to the β-carbon atom of the aliphatic radical connected with a hydrazine nitrogen atom and another oxygen atom being bound to the corresponding γ-carbon atom, which hydrazide is obtained by condensing stearic acid phenyl-hydrazide with about 3 mols of glycidol and is a waxlike substance being soluble to easily dispersible in water and exerting good levelling powers on wool dyestuffs.

17. Hydrazides of aliphatic carboxylic acids containing at least 12 carbon atoms which are substituted at at least one hydrazine nitrogen atom by at least one aliphatic radical containing the grouping

and at least one oxygen atom, at least one oxygen atom being contained in a hydroxl group and one oxygen atom being bound to the β-carbon atom of the aliphatic radical connected with a hydrazine nitrogen atom, and are obtained by condensing hydrazides of aliphatic carboxylic acids containing at least 12 carbon atoms with at least one mol of glycidol and at least one mol of ethylene oxide, which hydrazides are liquid to solid substances soluble to easily dispersible in water.

18. The stearic acid hydrazide which is substituted at at least one hydrazine nitrogen atom by at least one aliphatic radical containing the grouping

and at least one oxygen atom, at least one oxygen atom being contained in a hydroxyl group and one oxygen atom being bound to the β-carbon atom of the aliphatic radical connected with a hydrazine nitrogen atom, and is obtained by condensing stearic acid hydrazide with about 2 mols of glycidol and condensing the product thus obtained with about 3 mols of ethylene oxide, which hydrazide is a wax-like substance, being soluble to easily dispersible in water and exerting good levelling powers on woll dyestuffs.

CHARLES GRAENACHER.
RICHARD SALLMANN.
JOST FREI.